Dec. 13, 1927.
J. D. SARTAKOFF
LIQUID GAUGE
Filed June 29, 1926
1,652,377
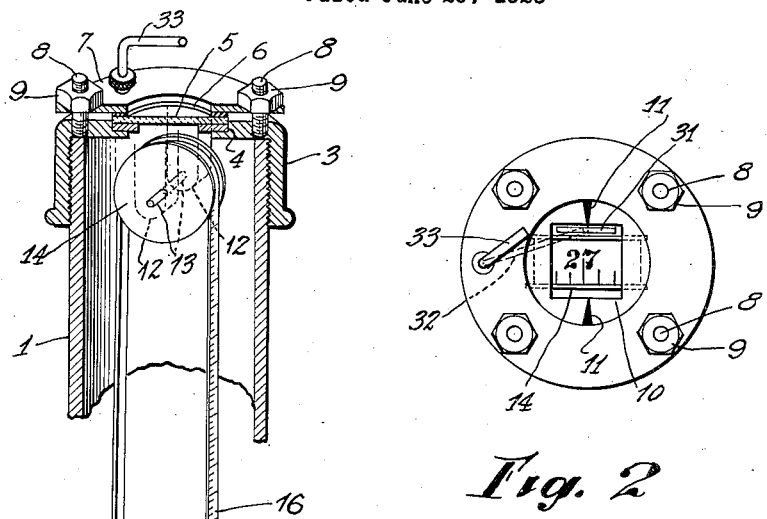
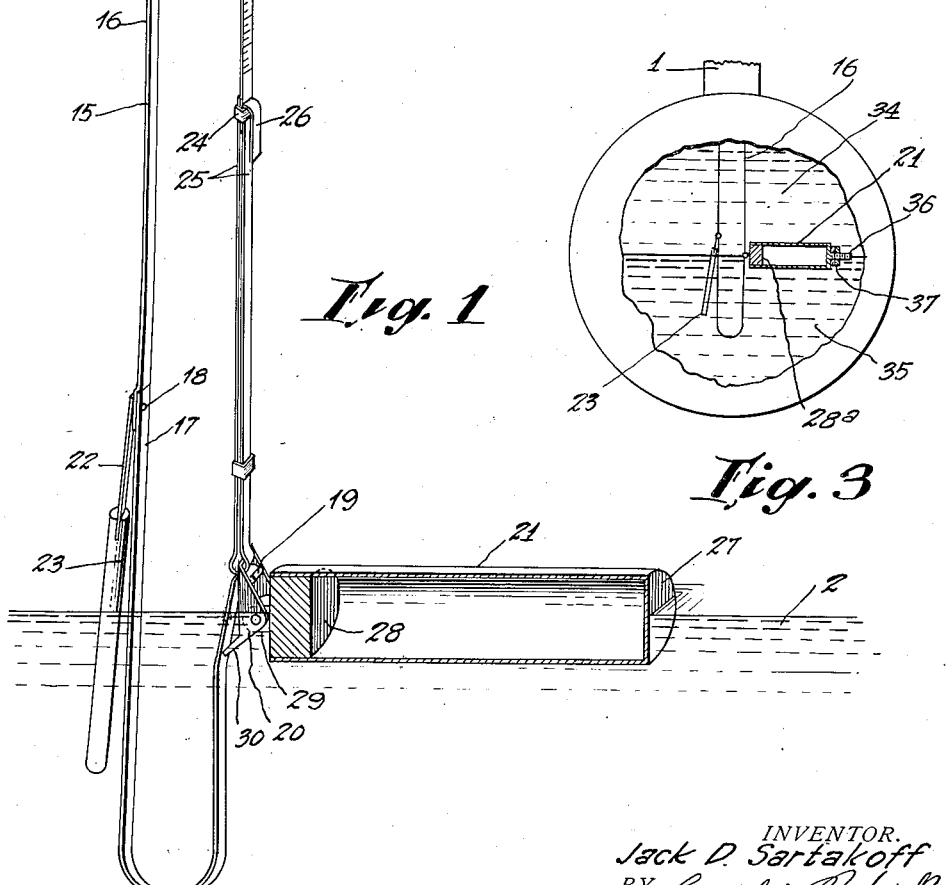
INVENTOR.
Jack D. Sartakoff
BY Cornelius Zabriskie
ATTORNEYS.

Patented Dec. 13, 1927.

1,652,377

UNITED STATES PATENT OFFICE.

JACK D. SARTAKOFF, OF NEW YORK, N. Y., ASSIGNOR, BY MESNE ASSIGNMENTS, OF ONE-HALF TO KHETAH CORPORATION, OF NEW YORK, N. Y., A CORPORATION OF NEW YORK.

LIQUID GAUGE.

Application filed June 29, 1926. Serial No. 119,308.

This invention is a gauge for measuring liquids contained in tanks and relates more particularly to gauges of that type wherein a reading is obtained from a graduated band or strap operated by a float.

The present invention constitutes a marked improvement on all prior gauges of this general type. For example, this invention provides for the installation of such a gauge on an underground tank without in anywise modifying the tank installation. Underground tanks are generally buried several feet below the surface and communicate with the surface through a pipe adapted for the reception of a measuring stick and having a cap for normally closing the top of this pipe.

The present gauge is such that the float together with the other operating parts of the device are adapted to be lowered through the conventional measuring stick pipe and to be supported upon a cap adapted to be screwed upon the threaded top of this pipe, so that the installation may be completed in a simple and expeditious manner and without digging down and cutting away a portion of the tank to allow the insertion of the operative mechanism as is commonly the case in prior constructions.

In all prior graduated band or tape gauges, it has been the practice to secure one end of a tape to a float and to counterbalance the weight of the float by a suitable counterbalancing weight secured to the other end of the tape. This construction cannot be carried and in utilizing such an arrangement in a large tank, the inaccuracy is very pronounced. For example, if such a gauge is associated with a tank 25 or 30 feet high, and a relatively heavy float employed, the tape used must necessarily be sufficiently heavy to carry the weight of the float and the counterbalance. Inasmuch as the maximum height of the liquid may be 25 feet greater than the minimum liquid level, it follows that there is an unbalanced weight of substantially 25 feet of tape to be considered. This will cause a greater or less submerging of the float depending upon the actual liquid level. In other words, there will be less submersion of the float at the higher levels than at the lower levels, if the counterbalance is arranged to exactly counterbalance the weight of the float and the opposite condition will prevail if an attempt is made to counterbalance the weight of the tape. It therefore follows that accurate measurements cannot possibly be obtained with the prior constructions. Furthermore, in the larger tanks of 20 or more feet in diameter, a fraction of an inch variation in the position of the float will obviously cause a false reading of many gallons variation from the true contents of the tank, so that in prior structures of which many have been suggested, correct readings cannot manifestly be obtained. It is one of the purposes of this invention to provide for an accurate reading and a true counterbalancing of the operating parts at all times.

It has been further heretofore suggested to employ a float operated tape to operate a train of gears with which a dial and pointer are associated. It is absolutely obvious to those skilled in the art that such measurements cannot be accurate due to clearance in gears and to the friction which necessarily obtains in such construction. The present invention entirely eliminates these detrimental features through the elimination of all gears and the mounting of the pulley or roller over which the tape operates in an antifriction bearing.

I have hereinbefore referred to the ability to associate the present invention with a conventional tank installation without in anywise changing such installation. This necessitates the utilization of a float of novel and unique construction which is adapted to be inserted through the measuring stick pipe in one position and constituted to automatically partake of proper operative position when coming into engagement with the liquid in the tank. This constitutes an important feature of the present invention. The float to which I have referred is preferably substantially cylindrical in form and is weighted at the end to which it is secured to the tape.

In hydrostatic feed systems, it is also weighted at the opposite end for reasons hereinafter explained. However, the weighting at the attached end of the float is carefully counterbalanced by a counterbalancing weight associated with the other end of the tape, so that when the float is partially submerged in the liquid of the tank, it will maintain a true horizontal position and this position will not vary in the least irrespective of the quantity of liquid in the tank or the position of the float vertically of the tank. The tape employed is an undivided, endless band, so that as the portion of the band to which the float is secured is elevated, the corresponding portion of the band is lowered, whereby there is at all times an absolute counterbalancing of the band and no greater or lesser weight is at any time imposed on either the counterbalancing or the float side of the pulley. By this means, and the utilization of an antifrictional mounted pulley, absolute accuracy is assured.

The present invention also provides for manual adjustment of the length of the belt, so that the device may be quickly and easily adapted to tanks of different sizes.

Features of the invention, other than those adverted to, will be apparent from the hereinafter detailed description and claims, when read in conjunction with the accompanying drawings.

The accompanying drawings illustrate different practical embodiments of the invention, but the constructions therein shown are to be understood as illustrative, only, and not as defining the limits of the invention.

Figure 1 is a perspective view showing the gauge of the present invention with fragmental portions of the tank shown in section in order to illustrate the manner in which the gauge is associated with the tank.

Figure 2 is a plan view of the invention as seen from the ground level; and,

Figure 3 illustrates the adaptation of the present invention to hydrostatic pressure systems. In this figure, the tank is shown with a portion of the end broken away and the measuring stick pipe also broken away.

Referring to the drawings, 1 designates a measuring stick pipe of an underground tank installation and 2 a liquid contained in said tank. It will of course be understood that the pipe 1 leads downwardly to the tank which contains the liquid 2. The upper end of the pipe 1 which generally reaches to a point above the ground is threaded and on this threaded portion of the pipe is screwed a cap 3 of the present invention.

The center portion of the cap is provided with a stepped opening in which is seated a gasket 4 and on this gasket seats a glass disk 5. Another gasket 6 bears on the glass disk and seated on the gasket 6 is a metallic ring 7.

Threaded stubs 8 screw downwardly through the cap and bear against the upper end of the pipe 1 to lock the cap 3 against turning and these stubs extend through perforations in the ring 7 and receive nuts 9 which serve to tightly clamp the ring down on the gasket and form a tight joint with the glass disk 5. This glass serves as a window through which the reading may be made. The gasket 4 is preferably provided with a square opening 10 and arrows or indicating fingers 11 are delineated on the upper face of the gasket and constitute the reading points, as clearly shown in Figure 2.

Depending from the under side of the cap 3 are brackets 12 which carry trunnions 13 and these trunnions support a pulley 14 for rotation on a horizontal axis. In practice, the inner ends of the trunnions are preferably pointed and extend into pockets in the opposite sides of the pulley, so as to provide a substantially anti friction bearing for the pulley.

Extending over and hanging from the pulley into the tank is an endless band 15. This entire band may be in the form of a tape, but in order to adapt the device for tanks of widely varying sizes, I preferably construct the band as shown in the drawings. Here the portion 16 of the band constitutes a tape and it is graduated as shown, preferably to read in terms of gallons.

One end of the tape 16 is secured to a strap 17 by a rivet 18 and this strap extends downwardly and is formed into a loop and has its opposite end secured at 19 to a hinged bracket 20 associated with the float 21. Also secured in place by the rivet 18 is a short link 22 carrying a counterbalance 23 hereinafter more fully described.

The other end of the tape is secured to a keeper 24 and also secured to this keeper in a permanent manner is one end of a strap 25. This strap is passed downwardly and through a slot in the bracket 20 of the float and is thence returned upon itself and passed through the keeper 24 and bent down as shown at 26. By thus arranging the strap 25, the size of the belt may be adjusted in order to obtain correct adjustment of the gauge to a particular tank in which it is to be installed.

The float 21 is shown as cylindrical. Its end 27 is closed and sealed while its opposite end is closed and sealed by a plug 28, having an exterior boss 29 to which the bracket 20 is pivoted. The bracket 20 has a tail piece 30, extending at such an angle as to preclude the hinging of the bracket in any direction except as shown in Figure 1. The purpose of this construction is that when the float is introduced into the tank, it is lowered through the pipe 1 in an upstanding position and when it is submerged in the liquid 2, it is adapted to partake of a perfectly horizontal position and float at the surface of the liquid. It is therefore necessary that the float be precluded against tilting in any direction except that which will permit it to partake of a truly horizontal position and the tail piece when formed as shown will accomplish this result.

In order to insure the horizontal position of the float while partially submerged in the liquid, the weight of the counterbalance 23 should be such as to accurately counterbalance the plug 28 and the strap 25. In other words, the parts should be so counterbalanced that the float will partake of a horizontal position with the same degree of submersion at all times irrespective of the liquid level. This can be accurately accomplished without refined skill or workmanship and since the counterbalance 23 may be at times submerged and at other times unsubmerged, I preferably make the counterbalance of relatively long cylindrical shape and construct it of lead so that it will not appreciably affect the liquid level by differences in displacement.

Experience has shown that the arrangement which I have described may be accurately counterbalanced to give absolutely true readings. These readings are obtained by looking through the glass window 5, as shown in Figure 2, since the graduations on the tape may be seen through the window and a clear reading thus be had. Experience has also shown that there is a tendency of the glass window to fog due to condensate on the inner face of the glass. To provide for removal of this condensate, positioned on the under side of the glass is a wiper 31 which is secured to an arm 32. This arm forms a part of an operating handle 33 which extends through the cap 3 and clamping ring 7 and may be manually oscillated to wipe the condensate from the glass.

The arrangement which has been described is intended for use in tank installations wherein the liquid is either pumped from the tank or forced therefrom by pneumatic pressure. In tanks employing a hydrostatic feed, a slightly modified form of float should be used. In hydrostatic pressure systems, as generally employed, water from a street main is introduced into the tank under main pressure to force gasoline out of the tank whenever the outlet valve is open. Because of the different specific gravities of gasoline and water, the gasoline stratifies above the water leaving a clear line of stratification between the two liquids. I have found it entirely practical to so weight and counterbalance the float that the gauge of this invention will work accurately with such a system.

In Figure 3, the gasoline strata is designated 34 and the water strata 35. Associated with the free end of the float in this figure is a threaded post 36 on which one or more relatively light weights 37 may be screwed. These weights together with a properly weighted plug 28ª will render the float buoyant as to water and non-buoyant as to gasoline. Such a float, when properly weighted at 37, will maintain its horizontal position at the stratification line between the water and gasoline and the guage will operate efficiently in the same manner as hereinbefore described.

The structure is simple, economical to manufacture and may be readily installed. Moreover, it is absolutely accurate in the measuring of the tank contents. The drawings show the invention in its preferred practical form, but the invention is to be understood as fully commensurate with the appended claims.

In the foregoing detailed description, I have, for the purpose of illustration, referred to the gauge of this invention as particularly adapted for use in conjunction with underground gasoline tank installations, such as are used at service stations. I wish it understood, however, that the invention is not limited to this specific use, but is in fact capable of general application wherever it is desired to measure liquids of any character.

Having thus fully described the invention, what I claim as new and desire to secure by Letters Patent is:

1. In a liquid gauge, a pulley, means for mounting the pulley to rotate on a horizontal axis, an endless belt embracing the pulley and depending therefrom, at least a portion of which belt is graduated to provide a reading scale, an elongated float weighted at one end and secured at its weighted end to one depending reach of the belt, and a weight secured to the other depending reach of the belt to substantially counterbalance the attached end of the float, whereby the float is caused to float in a substantially horizontal position.

2. In a liquid gauge, a pulley, means for mounting the pulley to rotate on a horizontal axis, an endless belt embracing the pulley and depending therefrom, at least a portion of which belt is graduated to provide a reading scale, an elongated float weighted at one end and secured at its weighted end to one depending reach of the belt, a weight secured to the other depending reach of the belt to substantially counterbalance the attached end of the float, whereby the float is caused to float in a substantially horizontal position, and means for adjusting the length of the belt to effect an adjustment between the float and the graduated portion of the belt.

3. In a liquid gauge, a cap adapted to be rigidly secured with respect to a tank containing the liquid to be measured, and said cap having a sight opening therein, a pulley, means for mounting the pulley on a horizontal axis directly below the opening, an endless belt embracing the pulley and depending therefrom, and at least a portion of which belt is graduated to provide a reading scale, an elongated float weighted at one end and secured at its weighted end to one depending reach of the belt, and a weight secured to the other depending reach of the belt to substantially counterbalance the attached end of the float, whereby the float is caused to float in a substantially horizontal position.

4. In a liquid gauge, a cap adapted to be rigidly secured with respect to a tank containing the liquid to be measured, and said cap having a sight opening therein, a pulley, means for mounting the pulley on a horizontal axis directly below the opening, an endless belt embracing the pulley and depending therefrom, and at least a portion of which belt is graduated to provide a reading scale, an elongated float weighted at one end and secured at its weighted end to one depending reach of the belt, a weight secured to the other depending reach of the belt to substantially counterbalance the attached end of the float, whereby the float is caused to float in a substantially horizontal position, a transparent covering for the sight opening in the cap, and means for removing condensate from the inner face of the transparent covering.

5. In a liquid gauge, a pulley, means for mounting the pulley for rotation on a horizontal axis above and in cooperative relation with a tank containing the liquid to be measured, an endless belt embracing the pulley and hanging therefrom in the form of a loose loop, at least a portion of which belt is graduated to provide a reading scale, and an elongated tubular float, one end of which is secured to the belt for pivotal movement thereon and the pivoted end of the float being weighted, a weight secured to the other depending reach of the belt to substantially counterbalance the weighted end of the float, whereby the float when immersed in a liquid is adapted to float in a substantially horizontal position.

6. In a liquid gauge, a pulley, means for supporting the pulley to rotate on a horizontal axis, an endless belt embracing the pulley and depending therefrom, at least a portion of which belt is graduated to provide a reading scale, an elongated float weighted at one end and secured at the weighted end to one depending reach of the belt, and a weight secured to the other depending reach of the belt to substantially counterbalance the weighted end of the float and cause the float to float in substantially horizontal position, said float being constituted to sink in gasoline and to float in a liquid of higher specific gravity.

7. In a liquid gauge, a pulley, means for mounting the pulley to rotate on a horizontal axis, a belt hanging over the pulley and graduated to provide a reading scale, an elongated float weighted at one end and secured at its weighted end to one depending reach of the belt, and a weight secured to the other depending reach of the belt to substantially counterbalance the weighted end of the float, whereby the float is caused to float in a substantially horizontal position.

8. In a liquid gauge, a cap adapted to be rigidly secured with respect to a tank containing the liquid to be measured, and said cap having a sight opening therein, a pulley, means for supporting the pulley on a horizontal axis directly below the opening, a graduated band extending over the pulley and hanging therefrom, an elongated float weighted at one end and secured at its weighted end to one depending reach of the band, and a weight secured to the other depending reach of the band to counterbalance the weighted end of the float whereby the float is caused to float in a substantially horizontal position.

In testimony whereof, JACK D. SARTAKOFF has signed his name to this specification, this 24 day of June, 1926.

JACK D. SARTAKOFF.